(12) United States Patent
Zhao (10) Patent No.: US 10,470,260 B1
(45) Date of Patent: Nov. 5, 2019

(54) LAMP POWER SUPPLY WITH 0 PERCENT FLICKER AND 0 FLICKER INDEX

(71) Applicant: Wei Zhao, Allen, TX (US)

(72) Inventor: Wei Zhao, Allen, TX (US)

( * ) Notice: Subject to any disclaimer, the term of this patent is extended or adjusted under 35 U.S.C. 154(b) by 0 days.

(21) Appl. No.: 16/399,983

(22) Filed: Apr. 30, 2019

(51) Int. Cl.
| | |
|---|---|
| *H05B 37/02* | (2006.01) |
| *H05B 33/08* | (2006.01) |
| *H05B 41/14* | (2006.01) |
| *H05B 39/04* | (2006.01) |
| *F21V 23/00* | (2015.01) |

(52) U.S. Cl.
CPC ....... *H05B 33/0809* (2013.01); *F21V 23/003* (2013.01); *H05B 37/0209* (2013.01); *H05B 39/04* (2013.01); *H05B 41/14* (2013.01)

(58) Field of Classification Search
CPC H05B 33/0809; H05B 39/04; H05B 37/0209; H05B 41/14; F21V 23/003
See application file for complete search history.

(56) References Cited

U.S. PATENT DOCUMENTS

2011/0140630 A1\* 6/2011 Doudousakis ........ H02M 3/156
315/291

\* cited by examiner

*Primary Examiner* — Daniel D Chang (57) ABSTRACT

A lamp power supply realize 0 percent flicker and 0 flicker index with feedback setting the product of voltage and current of the lamp equal to the reference voltage times a constant.

10 Claims, 7 Drawing Sheets

LAMP POWER SUPPLY WITH 0 PERCENT FLICKER AND 0 FLICKER INDEX

BACKGROUND

Traditional control way for a LED lamp powers supply is either a constant voltage control or a constant current control. But both of the control ways cannot remove the flicker. Flicker is a change in brightness of a light source. Many research papers have proved flicker can induce eyestrain and eyestrain is related to myopia.

SUMMARY

In general, the specification describes a lamp power supply with both voltage and current control to realize 0 percent flicker and 0 flicker index for a lamp.

DETAIL DESCRIPTION

Figure 1:
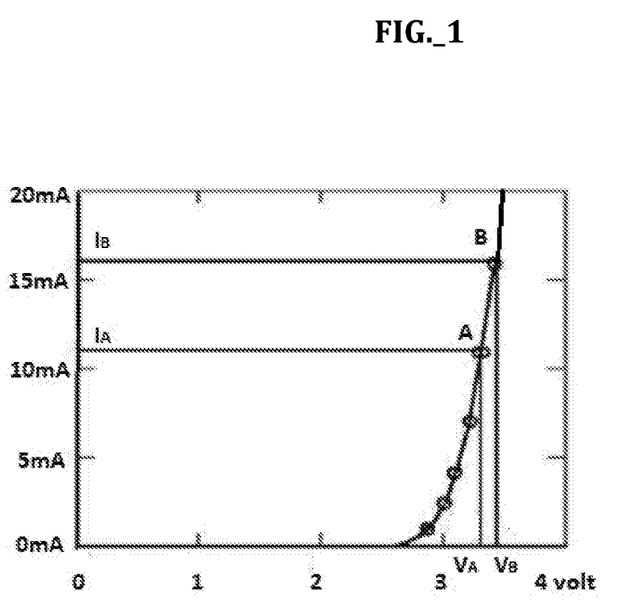
FIG. 1 is a current vs. voltage diagram of a LED with a constant voltage control.

FIG. 1 is a current vs. voltage diagram of a LED with a constant voltage control.

When the output has a small voltage variation from $V_A$ to $V_B$, there is a huge current variation from IA to $I_B$. The operating point is from A to B. $V_A$ is the voltage across the LED at the operation point A; $V_B$ is the voltage across the LED at the operation point B; $I_A$ is the current through the LED at the operation point A; $I_B$ is the current through the LED at the operation point B.

The area enclosed by $V_A$-A-$I_A$-0 is S1; the area enclosed by $V_B$-B-$I_B$-0 is S2. S2 is much larger than S1. S1 is proportional to the brightness of the LED lamp at the operation point A and S2 is proportional to the brightness of the LED lamp at the operation point B. So a small voltage variation in a constant voltage control induced a huge variation of the brightness for a LED lamp.

Figure 2:
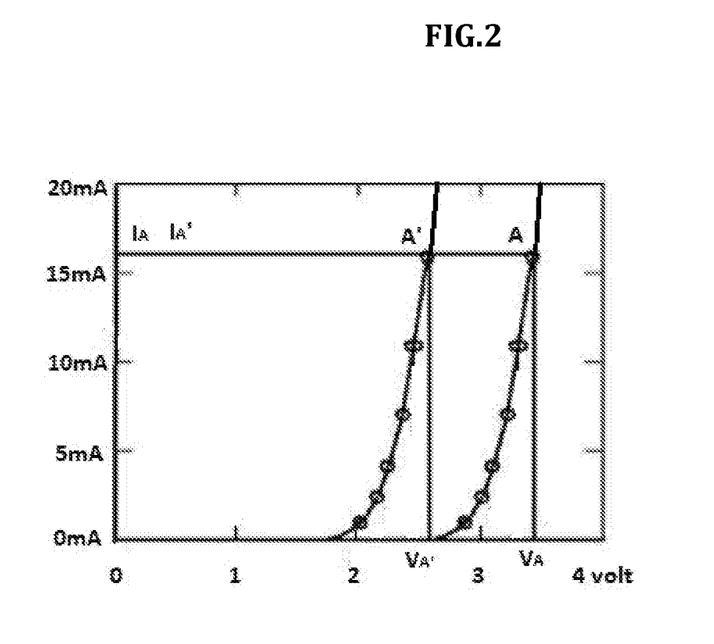
FIG. 2 is a current vs. voltage diagram of a LED with a constant current control.

FIG. 2 is a current vs. voltage diagram of a LED with a constant current control.

For a LED, a small temperature increase will move the current-voltage curve to the left. The operating point A moves to A' with a huge voltage variation from $V_A$ to $V_{A'}$. $V_A$ is the voltage across the LED at the operation point A; $V_{A'}$ is the voltage across the LED at the operation point A'; $I_A$ is the current through the LED at the operation point A; $I_{A'}$ is the current through the LED at the operation point A'. $I_A$=$I_{A'}$.

The area enclosed by $V_A$-A-$I_A$-0 is S2; the area enclosed by $V_{A'}$-A'-$I_{A'}$-0 is S1. S2 is much larger than S1. S1 is proportional to the brightness of a LED at the operation point A' and S2 is proportional to the brightness of a LED at the operation point A. So a small temperature variation will induce a huge brightness variation for a LED with a constant current control.

Figure 3:
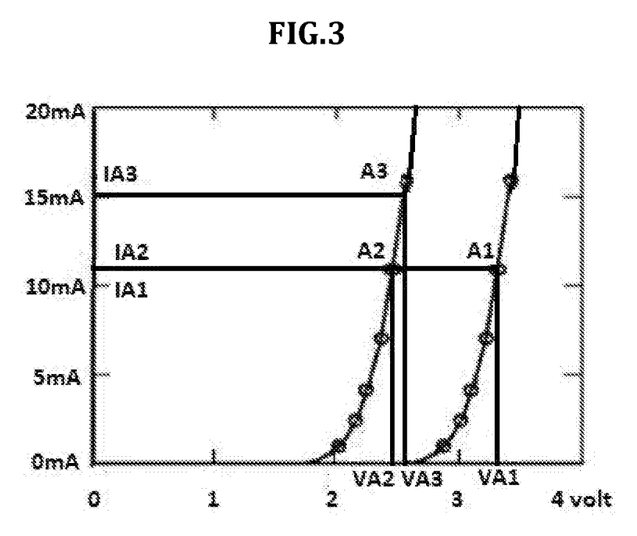
FIG. 3 is a current vs. voltage diagram of a LED with both voltage and current control.

FIG. 3 is a current vs. voltage diagram of a LED with both voltage and current control.

A small temperature increase induced the current-voltage curve to move to the left. The operating point A1 moved to A2 with a huge voltage variation from VA1 to VA2. VA1 is the voltage across a LED at the operation point A1; VA2 is the voltage across a led at the operation point A2. IA1 is the current through a LED at the operation point A1; IA2 is the current through a LED at the operation point A2. IA1=IA2.

The area enclosed by VA1-A1-IA1-0 is S1; the area enclosed by VA2-A2-IA2-0 is S2. S1 is much larger than S2. Then the both voltage and current control moves the operating point from A2 to A3 such that the area enclosed by VA3-A3-IA3-0 is equal to S3. S3 is proportional to the brightness of point A3 and S1 is proportional to the brightness of point A1. S3=S1. So the brightness has no variation and percent flicker is 0% and flicker index is 0.

Figure 4:
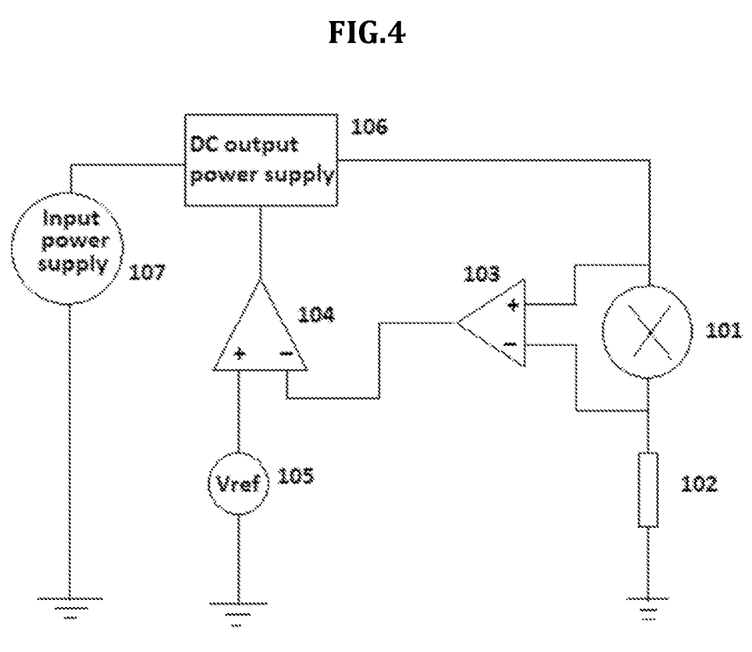
FIG. 4 is a schematic of a LED driving circuit with a constant voltage control.

FIG. 4 is a schematic for a LED driving circuit with a constant voltage control

Lamp 101 is a LED, or LEDs in series or in a matrix. Resistor 102 is a resistor or resistors in series with lamp 101. Feedback voltage sense 103 is an error-amplifier sensing the voltage across lamp 101; the output of 103 sends the voltage signal to the inverting input of error amplifier 104. Error amplifier 104 is an error-amplifier with the non-inverting input connected to Vref 105. Vref 105 is a voltage reference. 104 compares the voltage signal from 103 to Vref 105, output of 104 sends the error signal to DC output power supply 106. 106 is either an AC-DC converter or a DC-DC converter with a DC output voltage, 106 will increase or decrease the output voltage corresponding to the feedback voltage error signal from 104. Input power supply 107 is either an AC voltage source or a DC voltage source.

Figure 5:
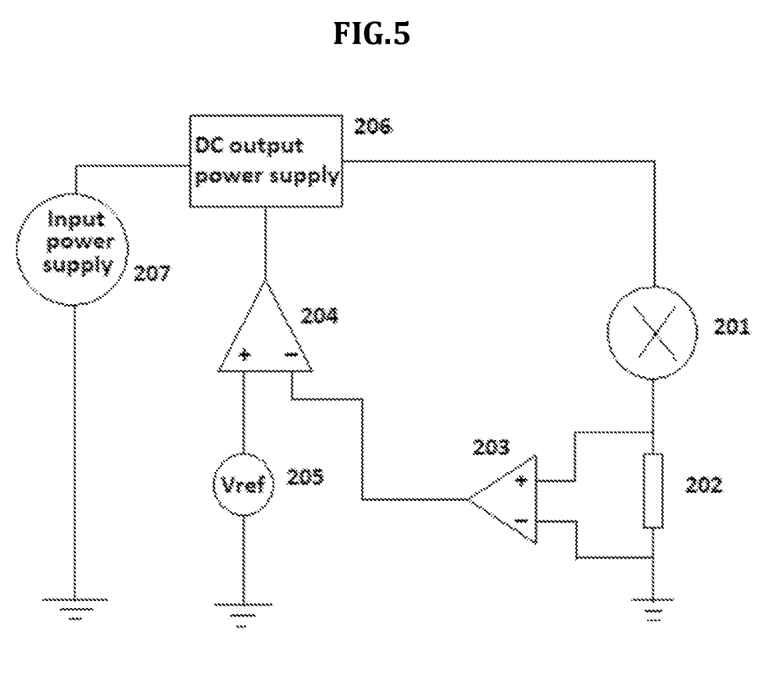
FIG. 5 is a schematic of a LED driving circuit with a constant current control.

FIG. 5 is a schematic for a LED driving circuit with a constant current control

In FIG. 5, lamp 201 is a LED, or LEDs in series or in a matrix. Resistor 202 is a resistor or resistors in series with lamp 201. Feedback current sense 203 is an amplifier to sense the voltage across 202 and sends the amplified signal to the inverting input of error amplifier 204. Error amplifier 204 compares the signal from 203 to Vref 205 and sends the error signal to DC output power supply 206. Vref 205 is a voltage reference. DC output power supply 206 is a power supply with a DC output voltage with input from input power supply 207. Input power supply 207 is either an AC voltage source or a DC voltage source.

Figure 6:
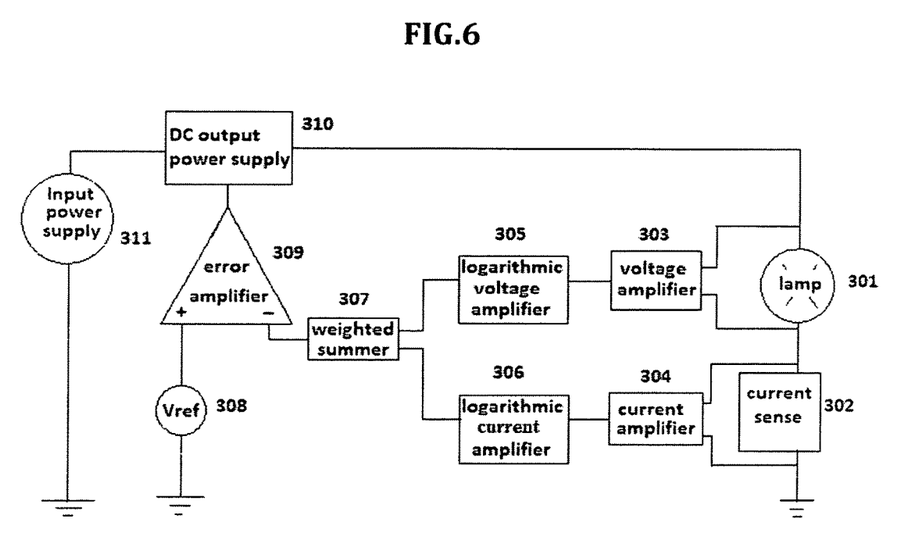
FIG. 6 is a block diagram for a lamp driving circuit with both voltage and current control.

FIG. 6 is a block diagram for a lamp driving circuit with both voltage and current control.

In FIG. 6, lamp 301 is a LED, an OLED, a QLED, a Halogen, an incandescent, a fluorescent or LEDs, OLEDs, QLEDs, Halogen lamps, incandescent lamps, fluorescent lamp in series or in a matrix. Lamp 301 is in series with current sense 302; voltage amplifier 303 senses the voltage across lamp 301 and sends the amplified signal to logarithmic voltage amplifier 305. Current amplifier 304 senses the current through current sense 302 and sends the amplified signal to logarithmic current amplifier 306. Logarithmic voltage amplifier 305 converts the signal from 303 to a logarithmic value and sends to weighted summer 307. Logarithmic current amplifier 306 converts the signal from 304 to a logarithmic value and sends to weighted summer 307. Weighted summer 307 sums the signals from 305 and 306 and sends the sums signal to the inverting input of error amplifier 309. Error amplifier 309 compares signal from 307 to Vref 308 and sends the error signal to DC output power supply 310. Vref 308 is a voltage reference to set the brightness level of 301. 310 is a DC output power supply with input from input power supply 311. Input power supply 311 is an AC voltage source or a DC voltage source.

Figure 7:
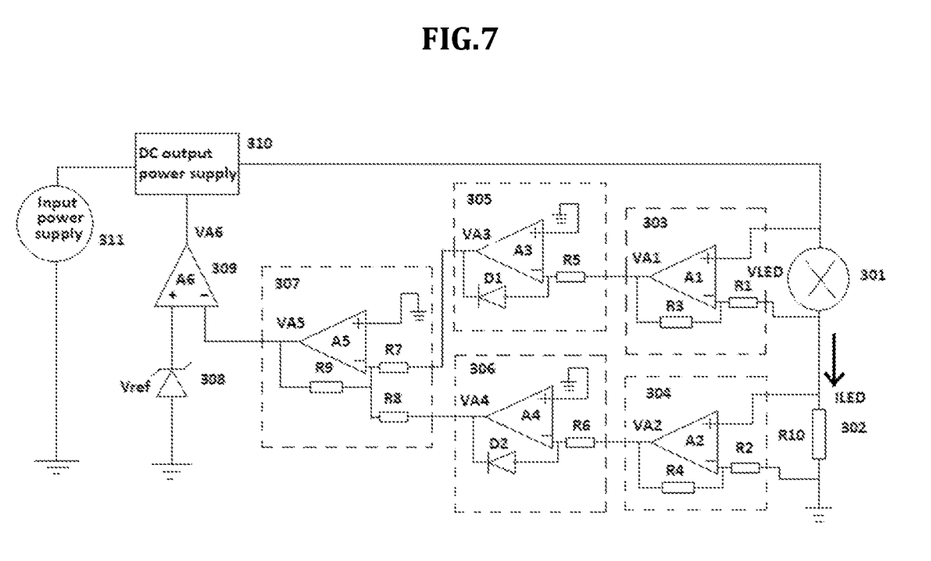
FIG. 7 is a schematic for a lamp driving circuit with both voltage and current control.

FIG. 7 is a schematic for a lamp driving circuit with both voltage and current control.

In FIG. 7, lamp 301 is in series with current sense 302; in one implementation, 301 is a LED or LEDs in series or in a matrix; in one implementation, 302 is a resistor or parallel resistors in series with lamp 301.

Voltage amplifier 303 senses the voltage across lamp 301 and sends the amplified signal to logarithmic voltage amplifier 305. 303 is composed of an operational amplifier A1 and resistors R3, R1.

Current amplifier 304 senses the current through current sense 302 and sends the amplified signal to logarithmic current amplifier 306. 304 is composed of an operational amplifier A2 and resistors R2, R4.

Logarithmic voltage amplifier 305 converts the signal from 303 to a logarithmic signal and sends to weighted summer 307. 305 is composed of an operational amplifier A3, a resistor R5 and a diode D1.

Logarithmic current amplifier 306 converts the signal from 304 to a logarithmic signal and sends to weighted summer 307. 306 is composed of an operational amplifier A4, a resistor R6 and a diode D2.

Weighted summer 307 sums the signal from 305 and 306 and sends the sums signal to the inverting input of error amplifier 309. The weighted summer 307 is composed of an operational amplifier A5 and resistors R7, R8, R9.

Error amplifier 309 compares the signal from 307 to Vref 308 and sends the error signal to DC output power supply 310.

Vref 308 is a voltage reference to set the brightness level of lamp 301.

DC output power supply 310 is a DC output power supply with input from input power supply 311.

Input power supply 311 is either an AC or a DC voltage source.

DETAIL DESCRIPTION

In FIG. 7, a schematic for a lamp driving circuit with both voltage and current control.

In lamp 301, VLED is the voltage across 301;

In current sense 302, resistor R10 is in series with lamp 301 to sense the current ILED through lamp 301;

In voltage amplifier 303, resistors R3, R1 are connected to an operational amplifier A1, VA1 is the output voltage of the operational amplifier A1;

$$VA1 = VLED \cdot (1 + R3/R1) \quad (1)$$

In current amplifier 304, resistors R4, R2 are connected to an operational amplifier A2, VA2 is the output voltage of the operational amplifier A2.

$$VA2 = ILED \cdot R10 \cdot (1 + R4/R2) \quad (2)$$

In logarithmic voltage amplifier 305, resistor R5 and diode D1 are connected to the operational amplifier A3, VA3 is the output voltage of the operational amplifier A3.

$$VA3 = -Vt \cdot \ln(VA1/(Is \cdot R5)) \quad (3)$$

Vt is the thermal voltage of the diode D1, Is is the saturation current of the diode D1, the constant n of the diode is selected as 1, so n is not shown in the equation;

In logarithmic current amplifier 306, resistor R6 and diode D2 are connected to the operational amplifier A4, VA4 is the output voltage of the operational amplifier A4.

$$VA4 = -Vt \cdot \ln(VA2/(Is \cdot R6)) \quad (4)$$

Vt is the thermal voltage of the diode D2, Is is the saturation current of the diode D2, the constant n of the diode is selected as 1, so n is not shown in the equation, Equation (1) is substituted into (3), we get $VA3 = -Vt \cdot \ln(VLED \cdot (1+R3/R1)/(Is \cdot R5))$ (5)

Equation (2) is substituted into (4), we get $VA4 = -Vt \cdot \ln(ILED \cdot R10 \cdot (1+R4/R2)/(Is \cdot R6))$ (6)

In weighted summer 307, VA3 is connected to a resistor R7 and VA4 is connected to a resistor R8. Resistors R7, R8 and R9 are connected to an operational amplifier A5. The inputs of A5 come from VA3 and VA4. VA5 is the output voltage of A5.

$$VA5 = -R9 \cdot (VA3/R7 + VA4/R8) \quad (7)$$

Equations (5), (6) are substituted into the equation (7)

$$V_A5 = -R9 \cdot (-Vt \cdot \ln(VLED \cdot (1+R3/R1)/(Is \cdot R5))/R7 - Vt \cdot \ln(ILED \cdot R10 \cdot (1+R4/R2)/(Is \cdot R6))/R8) \quad (8)$$

In one application, we select R3/R1=9 and R4/R2=9, R7=1 ohm, R8=1 ohm, Is*R5=1 volt, Is*R6=1 volt, R10=1 ohm, R9·Vt=1 volt $$VA5 = \ln(VLED \cdot 10) + \ln(ILED \cdot 10) = \ln(VLED \cdot ILED \cdot 100) \quad (9)$$

In error amplifier 309, the operational amplifier sets $V_A5$=Vref, Vref is a voltage reference in Vref 308.

We get ln(VLED·ILED·100)=Vref, then VLED·ILED·100=EXP(Vref),

So VLED·ILED=EXP(Vref)/100 (10)

In one application, we can set the product of the voltage and current of the LEDs 301 as a constant value. Then the brightness will not vary with temperature or voltage variation. And we realize 0 percent flicker and 0 flicker index.

One of the implementations has been described. Nevertheless, it will be understood that various modifications may be made without departing from the spirit and scope of the invention. Lamp 301 can be a LED, an OLED, a QLED, an incandescent lamp, a fluorescent lamp, a halogen etc.; lamp 301 can be LEDs, OLEDs, QLEDs, incandescent lamps, fluorescent lamps, halogen lamps etc. in series or in a matrix. Input power supply 311 can be a DC voltage source or an AC voltage source. Current sense 302 can be a resistor or parallel resistors in series with lamps in lamp 301. Accordingly, other implementations are within the scope of the following claims.

What is claimed is:

1. A power supply comprising:
   a lamp;
   a current sense operable to sense the current through the lamp;
   a voltage amplifier operable to sense the voltage across the lamp;
   a current amplifier operable to sense the current through the lamp with voltage across the current sense;
   a logarithmic voltage amplifier operable to convert the voltage from the voltage amplifier to a logarithmic voltage value;
   a logarithmic current amplifier operable to convert the current from the current amplifier to a logarithmic current value;

a weighted summer amplifier operable to add the signals from the logarithmic voltage amplifier and the logarithmic current amplifier;

a voltage reference;

an error amplifier operable to compare the signal from the weighted summer amplifier to the voltage reference;

a DC output power supply; and an input power supply.

2. The power supply of claim 1, wherein:
the lamp is a LED, an OLED, a QLED, an incandescent, a fluorescent, a halogen or LEDs, OLEDs, QLEDs, incandescent lamps, fluorescent lamps, halogen lamps in series or in matrix.

3. The power supply of claim 1, wherein:
the current sense is a resistor in series with the lamp or parallel resistors in series with the lamp.

4. The power supply of claim 1, wherein:
the input power supply is an AC voltage source, a DC power supply or a battery with a DC voltage.

5. The power supply of claim 1, wherein:
the DC output power supply is a DC to DC converter or an AC to DC converter.

6. The power supply of claim 1, wherein:
the voltage amplifier is either a analog circuit or a digital circuit.

7. The power supply of claim 1, wherein:
the current amplifier is either a analog circuit or a digital circuit.

8. The power supply of claim 1, wherein:
the logarithmic voltage amplifier is either an analog circuit or a digital circuit.

9. The power supply of claim 1, wherein:
the logarithmic current amplifier is either an analog circuit or a digital circuit.

10. The power supply of claim 1, wherein:
the voltage reference is a constant voltage source.

* * * * *